US009813879B2

(12) United States Patent
Song et al.

(10) Patent No.: US 9,813,879 B2
(45) Date of Patent: Nov. 7, 2017

(54) MOBILE DEVICE EXECUTING FACE-TO-FACE INTERACTION MONITORING, METHOD OF MONITORING FACE-TO-FACE INTERACTION USING THE SAME, AND INTERACTION MONITORING SYSTEM INCLUDING THE SAME, AND MOBILE INTERACTION MONITORING APPLICATION EXECUTED ON THE SAME

(71) Applicant: Korea Advanced Institute of Science and Technology, Daejeon (KR)

(72) Inventors: Junehwa Song, Daejeon (KR); Youngki Lee, Daejeon (KR); Chulhong Min, Daejeon (KR); Chanyou Hwang, Daejeon (KR); Jaeung Lee, Daejeon (KR); Inseok Hwang, Daejeon (KR); Younghyun Ju, Daejeon (KR); Chungkuk Yoo, Daejeon (KR); Miri Moon, Daejeon (KR); Uichin Lee, Daejeon (KR)

(73) Assignee: KOREA ADVANCED INSTITUTE OF SCIENCE & TECHNOLOGY (KAIST), Daejeon (KR)

( * ) Notice: Subject to any disclaimer, the term of this patent is extended or adjusted under 35 U.S.C. 154(b) by 134 days.

(21) Appl. No.: 14/302,440

(22) Filed: Jun. 12, 2014

(65) Prior Publication Data

US 2015/0302846 A1 Oct. 22, 2015

(30) Foreign Application Priority Data

Apr. 17, 2014 (KR) ........................ 10-2014-0045982

(51) Int. Cl.
*H04W 4/08* (2009.01)
*H04W 56/00* (2009.01)
(Continued)

(52) U.S. Cl.
CPC ............... *H04W 4/08* (2013.01); *G10L 25/48* (2013.01); *H04W 56/001* (2013.01); *G10L 17/00* (2013.01); *G10L 25/78* (2013.01)

(58) Field of Classification Search
None
See application file for complete search history.

(56) References Cited

U.S. PATENT DOCUMENTS

| 7,617,094 B2 * | 11/2009 | Aoki ..................... H04M 3/564 |
| | | 370/260 |
| 8,316,089 B2 * | 11/2012 | Thakkar ................. H04N 7/147 |
| | | 348/14.01 |

(Continued)

OTHER PUBLICATIONS

Lee et al., SocioPhone: Everyday Face-to-Face Interaction Monitoring Platform Using Multi-Phone Sensor Fusion, MobiSys'13, Jun. 28, 2013, Taipei, Taiwan.

*Primary Examiner* — Qian Yang
(74) *Attorney, Agent, or Firm* — Cho-Won IP Consulting; Hyun Ho Song

(57) ABSTRACT

Disclosed herein is a mobile face-to-face interaction monitoring device and method using the same and system including the same, for supporting accurate and efficient turn monitoring. One embodiment of the mobile face-to-face interaction monitoring device may comprise a conversation group detector for scanning mobile devices in a surrounding area and setting a conversation group, a turn detector for determining (conversational) turn using volume topography created based on sound signals detected in the mobile devices in the conversation group, and a meta-linguistic information processor for extracting meta-linguistic context of participants or interactants in the conversation group based on the turn. Other embodiments are described and shown.

32 Claims, 10 Drawing Sheets

(51) Int. Cl.
*G10L 25/48* (2013.01)
*G10L 17/00* (2013.01)
*G10L 25/78* (2013.01)

(56) References Cited

U.S. PATENT DOCUMENTS

| | | | | |
|---|---|---|---|---|
| 8,976,223 | B1* | 3/2015 | Leske | H04N 7/15 |
| | | | | 345/473 |
| 2006/0178887 | A1* | 8/2006 | Webber | G10L 15/144 |
| | | | | 704/256 |
| 2011/0054887 | A1* | 3/2011 | Muesch | H04S 3/00 |
| | | | | 704/225 |
| 2011/0131042 | A1* | 6/2011 | Nagatomo | G10L 15/18 |
| | | | | 704/240 |

* cited by examiner

| MONITORING CONVERSATION SESSIONS AND TURNS |
|---|
| registerSessionStartListener (callback(Session), conditions)<br>registerTurnChangeListener (callback(Turn))<br>* conditions = TARGET_PERSON \| TARGET_PLACE<br>class Session{ /* see FIG.4 */}; class Turn{ /* see FIG.5 */}; |
| MONITORING PROSODIC FEATURES & INTERACTION CHARACTERISTICS |
| enableProsodicFeature (session_id, /* features to enable */)<br>* Feature ={energy_avg, energy_var, pitch_avg, pitch_var, ...}<br>getSparsity (window_time \| window_turns)<br>getInteractivity (window_time \| window_turns)<br>getAsymmetry (window_time \| window_turns)<br>registerDominanceListener (callback(Interactant), Inferrer)<br>registerLeadershipListener (callback(Interactant), Inferrer) |
| QUERYING INTERACTION HISTORY |
| getOnGoingSessionHistory( "SQL_Query_Statement" );<br>getPastInteractionHistory( "SQL_Query_Statement" ); |

FIG. 3

| sID | INTERACTANTS | START_TIME | END_TIME | PLACE | ... |
|---|---|---|---|---|---|
| 1 | SHELDON, LEONARD | NOV-6 19:20 | NOV-6 21:05 | OFFICE | ... |
| 2 | WIFE | NOV-6 22:50 | NOV-6 23:08 | HOME | ... |
| ... | ... | ... | ... | ... | ... |

FIG. 4

| sID | tID | SPEAKER | START_TIME | END_TIME | PLACE | ... |
|---|---|---|---|---|---|---|
| 1 | 1 | SHELDON | 19:20:35 | 19:20:39 | POINTERS TO | ... |
| 1 | 2 | MYSELF | 19:20:39 | 19:21:04 | PROSODIC | ... |
| 1 | 3 | NOBODY | 19:21:04 | 19:21:11 | TABLE ENTRIES | ... |
| ... | ... | ... | ... | ... | ... | ... |

MOBILE DEVICE EXECUTING FACE-TO-FACE INTERACTION MONITORING, METHOD OF MONITORING FACE-TO-FACE INTERACTION USING THE SAME, AND INTERACTION MONITORING SYSTEM INCLUDING THE SAME, AND MOBILE INTERACTION MONITORING APPLICATION EXECUTED ON THE SAME

BACKGROUND

1. Field of the Invention

The present disclosure generally relates to a mobile interaction- and context-aware device. More particularly, the present disclosure relates to a mobile face-to-face interaction monitoring device, interaction monitoring method using the same, interaction monitoring system including the same, and interaction monitoring applications executed on the same.

2. Description of Related Art

In a mobile and ubiquitous computing environment, where computing is made to be everywhere and anywhere, certain entities (e.g., participants or interactants) interact with each other in a dynamically changing context, for instance, in achieving a joint goal or task. For such interaction, the entities need to be aware of not only their physical context (e.g. location) but also their changing relationships with respect to the particular goal or task. Commonly referred to as social context, the latter also involves awareness, for example, of particular time period, setting, and on-going event or development.

Face-to-face interaction is an integral part of human life. Everyday, people dine with family, have meetings with colleagues, and spend time with friends. A promising new direction thus lies in monitoring (e.g., sensing, capturing, analyzing, and utilizing) social context during everyday face-to-face interactions. However, accurate and efficient monitoring of such social context in a mobile and ubiquitous environment remains a challenge as it is very difficult to realize without system-level support.

BRIEF SUMMARY

According to one embodiment, a mobile face-to-face interaction monitoring device may comprise a conversation group detector for scanning one or more mobile devices in a surrounding area and setting a conversation group, a turn detector for determining turn by using volume topography created based on sound signals detected in the mobile devices in the conversation group, and a meta-linguistic information processor for extracting meta-linguistic context of interactants in the conversation group the based on the turn.

According to another embodiment, the conversation group detector may further comprise a voice detector for detecting sound signals and an interactant manager for storing mobile device addresses and forming the conversation group when the mobile devices having the addresses are scanned.

According to another embodiment, the conversation group detector may further comprise a subgroup detector for determining subgroup formation by analyzing overlapping speech pattern in the sound signals.

According to another embodiment, the conversation group detector may further comprise a head selector for selecting a head mobile device among a plurality of mobile devices in the conversation group, wherein the head mobile device collects the sound signals in the mobile devices in the conversation group, determines the turn, and transmits the turn to the mobile devices.

According to another embodiment, the mobile face-to-face interaction monitoring device may further comprise a monitoring planner for controlling monitoring of the turn based on information of the conversation group.

According to another embodiment, the monitoring planner may comprise a source selector for determining a quantity of the mobile devices in the conversation group and selecting one or more source mobile devices for collaborative turn monitoring among the mobile devices in the conversation group, and an execution planner for controlling the monitoring in the turn detector.

According to another embodiment, the monitoring planner may further comprise a sync manager for synchronizing the mobile devices in the conversation group.

According to another embodiment, the monitoring planner may further comprise a resource monitor for monitoring resources and resource utilization in the mobile devices.

According to another embodiment, the turn detector may comprise a volume topography builder for creating the volume topography based on the sound signals in the mobile devices in the conversation group, during a training period; and a volume topography matcher for determining current turn by matching current sound signals with the volume topography, after the training period.

According to another embodiment, the turn may have factors of speaker, start time, and end time.

According to another embodiment, the meta-linguistic information processor may comprise a feature extractor for extracting prosodic features of the sound signals and a pattern analyzer for determining interaction pattern among the interactants in the conversation group, based on the turn and at least one of the prosodic features.

According to another embodiments, the pattern analyzer may determine interactivity based on a quantity of the turn in a given time, sparseness based on a quantity of non-speech turn in a given time, and skewness based on a standard deviation of a quantity of the turn for all of the interactants, According to another embodiment, the mobile face-to-face interaction monitoring device may further comprise an interaction history manager for storing information of the turn and a conversation session and supporting user query and generating an interaction history based on the information.

According to an embodiment, a mobile face-to-face interaction monitoring method may comprise: scanning one or more mobile devices in a surrounding area and setting a conversation group; detecting sound signals in the mobile devices in the conversation group; creating volume topography based on the sound signals; determining turn by using the volume topography; and extracting meta-linguistic context of interactants in the conversation group based on the turn.

According to another embodiment, the mobile face-to-face interaction monitoring method may further comprise: determining a quantity of the mobile devices in the conversation group; and selecting one or more source devices among the mobile devices in the conversation group, for collaborative turn monitoring among the mobile devices in the conversation group.

According to another embodiment, the mobile face-to-face interaction monitoring method may further comprise synchronizing the mobile devices in the conversation group.

According to another embodiment, the volume topography may be created based on the sound signals during a training period.

According to another embodiment, the turn may be determined by using the volume topography by determining current turn by matching current sound signals with the volume topography, after the training period.

According to another embodiment, the volume topography may be created by using a feature vector P(t) defined as P(t)=(p(t,1), p(t,2), ..., p(t,np)), where p(t, i) is an average of a square of the sound signals in each mobile device i at a given time t, and where np is a quantity of the mobile devices in the conversation group.

According to another embodiment, the volume topography may be created by using a normalized vector P'(t) defined as P'(t)=P(t)/E(t), where E(t) is an average of the feature vector P(t).

According to another embodiment, the volume topography may be created by using a transformed vector P''(t) defined as $P''(t)=D(t)*P'(t)=$
$\{D(t,1)*p(t,1)/E(t), D(t,2)*p(t,2)/E(t), ..., D(t,np)*p(t,np)/E(t)\}$, where a decibel D(t) measured on the mobile device i, at the given time t, is defined as $D(t,i)=20*\log 10(p(t,i)/p.ref)$, where p.ref is a standard reference sound pressure level.

According to another embodiment, the quantity np of the mobile devices may be equal to or less than a number of the interactants in the conversation group.

According to another embodiment, a quantity of n+1 of the volume topography may be created, where n is a number of the interactants in the conversation group. Each of the n-quantity of the volume topography created may respectively correspond to each of the n-number of the interactants, and the 1-quantity of the volume topography created may correspond to non-speech in the conversation group.

According to another embodiment, the mobile face-to-face interaction monitoring method may further comprise recreating the volume topography when there is a change in the conversation group and the surrounding area.

According to another embodiment, the meta-linguistic context of interactants in the conversation group may be extracted based on the turn by extracting features of the turn; extracting prosodic features of the sound signals; and determining interaction pattern among the interactants in the conversation group, based on the features of the turn and at least one of the prosodic features.

According to one or more embodiments, the features of the turn may be extracted by determining the features of the turn categorized as: individual for each of the interactants, relational among the interactants, and cumulative for one or more conversation sessions and the conversation group.

According to an embodiment, the individual features of the turn may include speaking time, a quantity and duration of speech and non-speech turns, and associated statistics, for each of the interactants.

According to an embodiment, the relational features of the turn may include orders and frequencies of exchanges of the turns and ratio thereof, among the interactants in the conversation group.

According to an embodiment, the cumulative features of the turn may include a number of the interactants in the conversation sessions, a quantity and duration of the conversation sessions, and a quantity and duration of the turns in the conversation sessions and the conversation group.

According to an embodiment, an interaction monitoring system may comprise a first mobile device, which determines the turn, and at least one second mobile device, which receives the turn from the first mobile device.

According to an embodiment, the first mobile device may comprise a first conversation group detector for scanning one or more mobile devices in a surrounding area and setting a conversation group, a turn detector for determining turn by using volume topography created based on sound signals detected in the mobile devices, and a first meta-linguistic information processor for extracting meta-linguistic context of interactants in the conversation group the based on the turn.

According to an embodiment, the second mobile device may comprise a second conversation group detector for scanning the mobile devices in the surrounding area and setting the conversation group, and a second meta-linguistic information processor for extracting the meta-linguistic context of the interactants in the conversation group based on the turn received from the first mobile device.

BRIEF DESCRIPTION OF THE DRAWINGS

In the accompanying drawings, closely related figures (FIG.'s) have the same number but different alphabetical suffixes.

FIG. 3 is a diagram showing API's in the mobile device according to an embodiment.

FIG. 4 is a diagram showing a conversation session (structure) for the API's in the mobile device according to an embodiment.

DETAILED DESCRIPTION

Figure 1:
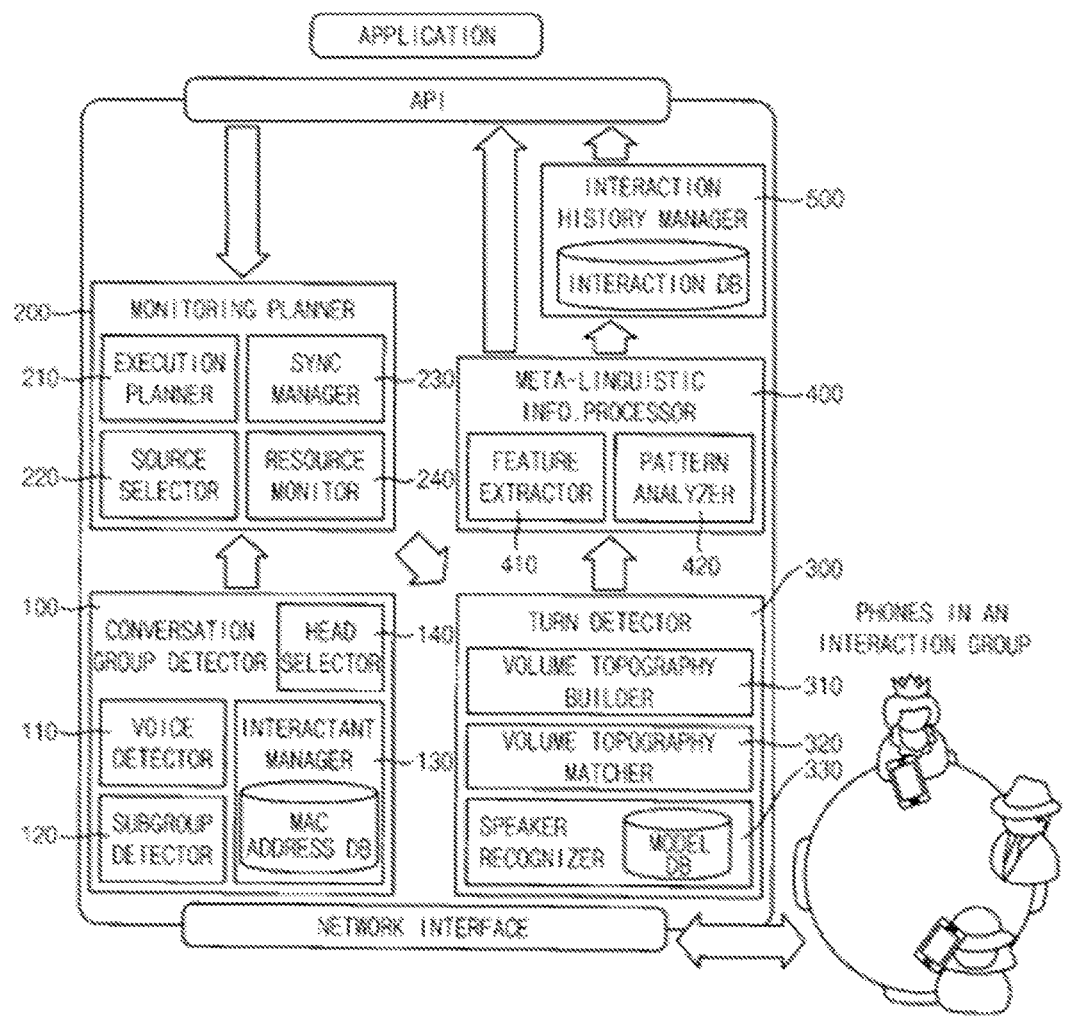
FIG. 1 is a block diagram showing a mobile interaction monitoring device according to an embodiment.
Figure 2:
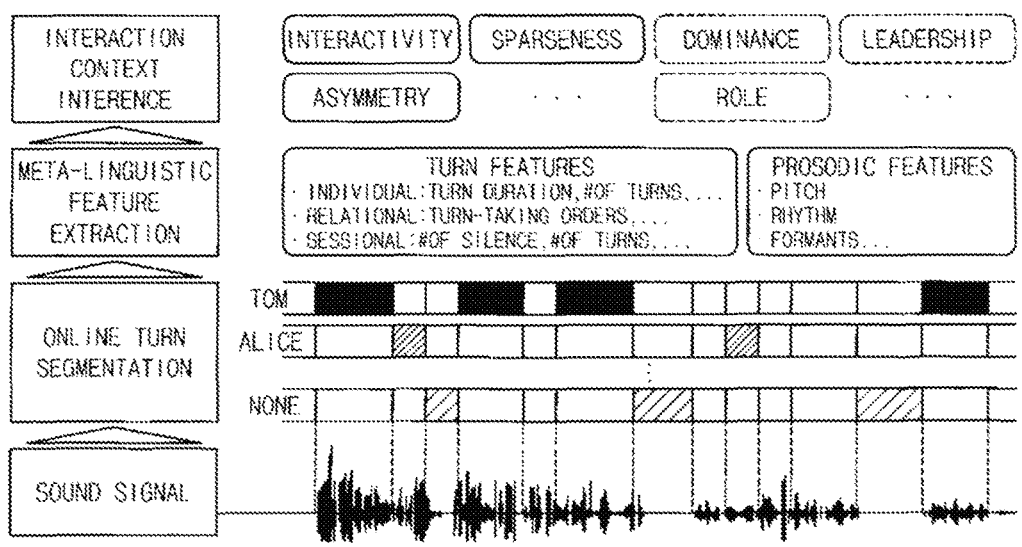
FIG. 2 is a high-level process diagram showing interaction monitoring (operation) in the mobile device according to an embodiment.

FIG. 1 is a block diagram showing a mobile interaction monitoring device, according to an embodiment. FIG. 2 is a high-level operation diagram showing interaction monitoring in the mobile device in FIG. 1, according to an embodiment.

Referring to FIG. 1 and FIG. 2, the mobile interaction monitoring device may include a conversation group detector 100, a turn detector 300, and a meta-linguistic information processor 400. The mobile device may further include a monitoring planner 200. The mobile device may further include an interaction history manager 500.

The mobile device may be one of a smartphone, tablet PC, PDA, and laptop computer. However, the mobile device is not limited to or dependent on such device types.

The mobile device may include a plurality of Application Program Interfaces (API's). Various interaction monitoring applications may be executed and operate in the mobile device, which includes the API's. Examples of the API's are described in detail with references to FIG. 3 through FIG. 5.

Figure 8A:
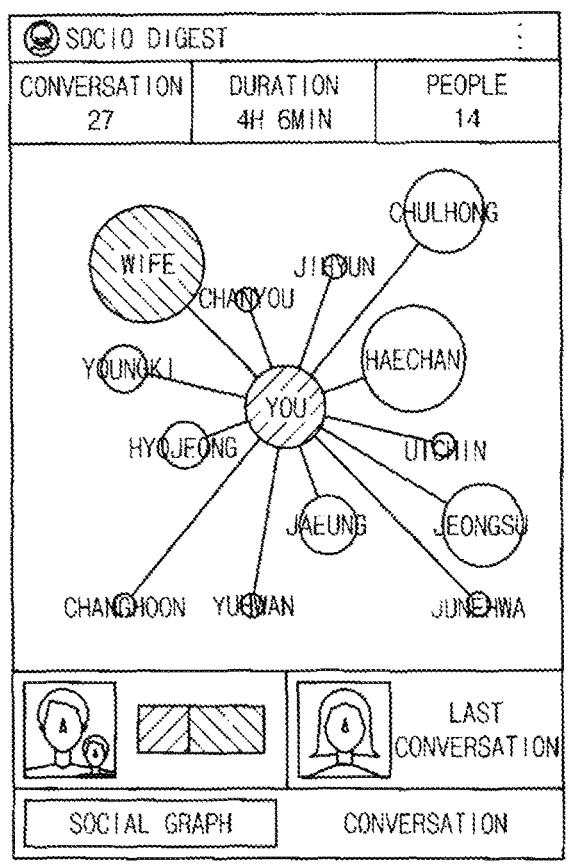
FIGS. 8A-8C are diagrams showing mobile interaction monitoring applications the mobile device according to an embodiment.
Figure 8B:
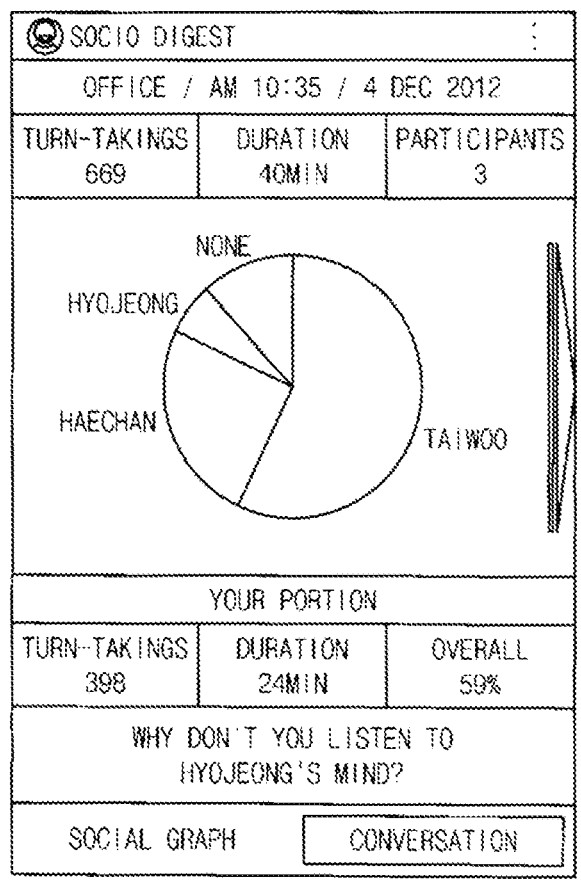
Figure 8C:
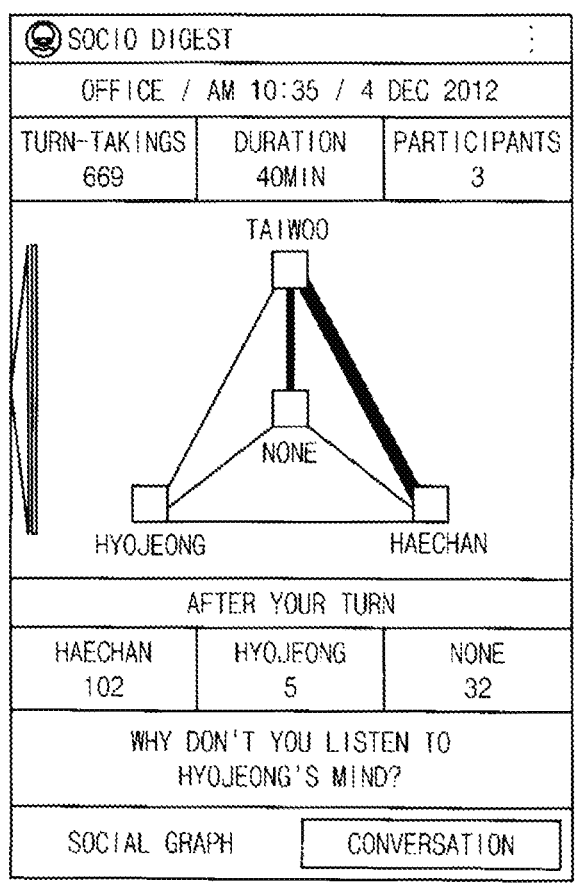

Examples of the interaction monitoring applications are described in detail with references to FIGS. 8A-8C.

The conversation group detector 100 scans one or more mobile devices, for example, belonging to participants or interactants, in a given perimeter or a general surrounding area and sets a conversation group. The conversation group detector 100 may include a voice detector 110, a subgroup detector 120, an interactant manager 130, and a head selector 140.

The voice detector 110 detects a human voice or sound signals. When sound signals are detected in a surrounding area, a conversation group may be formed by the conversation group detector 100. (Even) when mobile devices are scanned in a surrounding area, a conversation group may not be formed, for example, when the mobile devices are merely passing by or when a conversation is not on-going. According to one embodiment, the sound signals may be filtered or pre-filtered of the sound signals' non-human vocal spectrum and point-sourced sound or noise, which may distort the volume topography.

The mobile device scans and detects other mobile devices in a surrounding area via network interface. The mobile device may scan other mobile devices, for example, using Bluetooth technology.

The interactant manager 130 may include a database, which stores addresses of other mobile devices. For example, the interactant manager 130 may store MAC addresses of (other) mobile devices belonging to family and friends. The interactant manager 130 may form a conversation group when the mobile devices belonging to family and friends are scanned and detected.

The head selector 140 may select a head mobile device among a plurality of mobile devices in the conversation group. The head mobile device may perform turn monitoring and determine a (conversational) turn. The head mobile device may, for example, be randomly selected. According to one embodiment, the head selector 140 may be included in the monitoring planner 200.

The head mobile device may coordinate collaborative turn monitoring by the plurality of mobile devices in the conversation group. The head mobile device may collect the sound signals from the plurality of mobile devices in the conversation group and determine the turn. For example, other devices (e.g., non-head mobile devices) in the plurality of mobile devices may not determine the turn. The head mobile device may output or transmit the turn (e.g., information related to the turn) to the other devices in the plurality of mobile devices in the conversation group.

The subgroup detector 120 may determine subgroup formation by analyzing overlapping speech patterns in the sound signals detected in the plurality of mobile devices in the conversation group. A given conversation group may be further divided into a plurality of subgroups. Generally, in a single conversation-group situation, interactants' speech patterns do not overlap as the interactants, for example, speak one at a time. However, in a subdivided conversation-group situation (e.g., with subgroups), interactants' speech patterns, for example, in one subgroup, may overlap with speech patterns in another subgroup. Therefore, the subgroup detector 120 may divide the conversation group into a plurality of subgroups, based on overlapping speech patterns.

The monitoring planner 200 controls monitoring of the turn based on information related to the conversation group (e.g., provided by the conversation group detector 100). The monitoring planner 200 may include an execution planner 210, a source selector 220, a sync manager 230, and a resource monitor 240.

The execution planner 210 controls monitoring (operation) in the turn detector 300. The execution planner 210 may also perform conventional speaker or voice recognition.

The source selector 220 determines a quantity of the plurality of mobile devices in the conversation group and selects one or more source mobile device(s) among the plurality of mobiles devices in the conversation group for collaborative turn monitoring. The source selector 220 may, for example, check whether the mobile devices in the conversation group have sufficient power (e.g., battery levels) and whether the sound signals have sufficient clarity for discriminative volume topography. The source selector 220 may, for example, exclude as a source mobile device a mobile device with a low power level (e.g., less than 10% of battery power remaining) or a mobile device with a high noise level for increasing accuracy of the turn monitoring.

The sync manager 230 synchronizes the plurality of mobile devices in the conversation group. As the volume topography involves feature vectors, which has a time factor, time elements (e.g., clocks) in the plurality of mobile devices are aligned for increasing accuracy of the turn monitoring.

The resource monitor 240 monitors resources and resource utilization in the mobile devices, such as power levels and consumption, CPU utilization, and bandwidth states. The resource monitor 240 may monitor the resources and utilization in real-time and transmit information related to the resources and utilization to other mobile devices in the conversation group.

The turn detector 300 monitors and determines the turn using volume topography (database) generated based on the sound signals detected in the plurality of mobile devices in the conversation group. Generally in conversation analysis, the (conversational) turn is a continuous speech segment where a speaker starts and ends the speaker's speech. For example, the turn may indicate which one of the interactants in the conversation group is the speaker (speaking). The turn may have factors such as speaker (identity), start time, and end time and include the factors, for example, as turn information.

The turn detector 300 may include a volume topography builder 310, a volume topography matcher 320, and a speaker recognizer 330.

The volume topography builder 310 creates the volume topography based on the sound signals in the plurality of mobile devices in the conversation group. The volume topography may be created, for example, during a learning or training period. According to one embodiment, the volume topography builder 310 may re-train or recreate the volume topography to instantaneously incorporate or reflect any change in the conversation group and other dynamic events in the surrounding area.

The volume topography matcher 320 determines current turn by analyzing and matching current (incoming) sound signals with the volume topography, for example, after the training period.

The speaker recognizer 330 may generate a reference speech model of each of the interactants (e.g., owners of the mobile devices) and store the reference speech model in a database. Based on the reference speech model, the speaker recognizer 330 may identify and assign audio signatures (cluster-ID's) of the conversation group as/to voice or sound of the interactants (member-ID's) of the conversation group. Each of the mobile devices may, for example, generate MFCC (Mel-Frequency Cepstral Coefficient) and compute GMM's (Gaussian Mixture Models) based on the audio signatures of the owners of the mobile devices.

The monitoring (operation) in the turn detector 300 is described in detail with references to FIG. 6 and FIGS. 7A-7E.

The meta-linguistic information processor 400 monitors meta-linguistic interactions of the interactants in the conversation group and extracts or determines meta-linguistic context of the interactants based on the turn (information).

The meta-linguistic information processor 400 may determine and extract turn features from the turn. Referring to FIG. 2, the turn features may be categorized as features of the turn that are associated with an individual interactant, relationships among the interactants, and an entire interaction. The turn features associated with the individual interactant in the conversation group may, for example, include speaking time, a quantity and duration of speech and non-speech turns, and associated statistics. The turn features associated with the relationships among the interactants may, for example, include turn-taking orders, turn-taking frequencies, and a ratio of the turns between any two or (among) more of the interactants in the conversation group. The turn features associated with the entire interaction may, for example, include a number of the interactants in a conversation session, duration of one or more of the conversation session(s), and duration of the speech and non-speech turns in/for the conversation session(s) and the conversation group.

The meta-linguistic information processor 400 may include a feature extractor 410 and a pattern analyzer 420.

The feature extractor 410 extracts and processes prosodic features of the sound signals. The feature extractor 410 may, for example, determine volume or pitch of the sound signals and process means, variances, and distributions of the volume or the pitch. The feature extractor 410 may also, for example, determine rhythm, formants, bandwidth, and spectral intensity of the sound signals.

The pattern analyzer 420 determines interaction pattern or context among the interactants in the conversation group, based on the turn (information) or the turn features and at least one of the prosodic features (processed by the feature extractor 410). The pattern analyzer 420 may, for example, determine the interaction pattern or context based on the turn features complemented by at least one of the prosodic features.

For example, the pattern analyzer 420 may determine a pace of a conversation (session) based on the duration of the turn(s) of the interactants in the conversation group. The conversation session may, for example, be determined based on the start and end times of the turns.

For example, the pattern analyzer 420 may determine dominance and leadership (of the interactants) in the conversation group. The dominance may be determined based on the ratio of the turn(s) of or taken by the interactants in the conversation group. The leadership may be determined based on the ratio of the turn(s), and successive or interrupting turn characteristics of the interactants in the conversation group. Based on the dominance and leadership, the meta-linguistic information processor 400 may determines other meta-linguistic context of the interactants, for example, as to roles and role-playing patterns of the interactants in the conversation group.

For example, the pattern analyzer 420 may also determine conversational interactivity, sparseness, and skewness or asymmetry of the interactants in the conversation group. The interactivity may be determined based on the quantity of the turn(s) in a given time. The sparseness may be determined based on the quantity of non-speech (e.g., silence) turn(s) in a given time or over a given interval in a given time. The skewness may be determined based on a standard deviation of the quantity of the turn(s) for all of the interactants in the conversation group.

The interaction history manager 500 stores information related to the turn and the conversation session (e.g., associated with the turn). The interaction history manager 500 may support user query and generate an interaction report or history based, for example, on the information. The interaction history manager 500 may include a database for storing the information.

Examples of the user queries may be: "How many turns has John had in the last 10 minutes?" or "Who are the 3 friends with whom John has had most conversation sessions?"

Figures 5, 6:
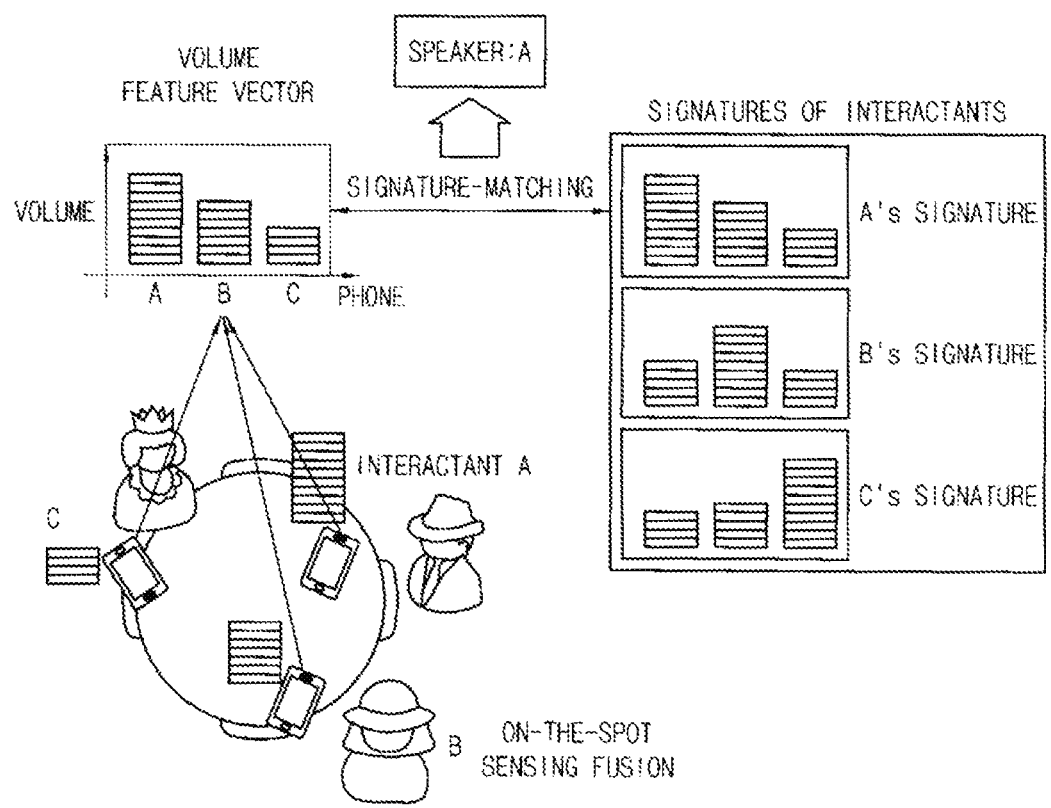
FIG. 5 is a diagram showing turn information for the API's in the mobile device according to an embodiment.
FIG. 6 is a diagram showing turn monitoring (operation) in the mobile device according to an embodiment.

FIG. 3 is a diagram showing examples of the API's in the mobile device in FIG. 1. FIG. 4 is a diagram showing an example of the conversation session (structure) for the API's in FIG. 3. FIG. 5 is a diagram showing an example of the turn information for the API's in FIG. 3.

Referring to FIG. 1 through FIG. 5, the API's in the mobile device may be classified as monitoring of the conversation session and turn, monitoring of the prosodic features and meta-linguistic interaction characteristics, and querying of the interaction history.

The API for the monitoring of the conversation session and turn may, for example, be registerSessionStartListener (callback(Session), conditions) for detecting (or tracing) a beginning of a session and registerTurnChangeListener(callback(Turn)) for detecting (or tracing) a turn change. The conditions for the registerSessionStartListner may be designated persons (TARGET_PERSON) or places (TARGET_PLACE). The registerSessionStartListner and the registerTurnChangeListner may detect (or trace) a beginning of the (conversation) session and the turn change, respectively, by using a callback function.

The API for the monitoring of the prosodic features and meta-linguistic interaction characteristics may, for example, be enableProsodicFeature(session_id, features) for retrieving the prosodic features (information) associated with the turn; and getSparsity, getInteractivity, getAsymmetry, registerDominanceListener, and registerLeadershipListner. For example, getSparsity determines how far the turn(s) are separated by the non-speech turn(s). For example, registerDominanceListener determines who among the interactants has dominance in the conversation session or in the conversation group.

The API for the querying of the interaction history may, for example, be getOnGoingSessionHistory("SQL_Query_Statement") for querying an on-going conversation session for current interaction history and getPastInteractionHistory("SQL_Query_Statement") for querying a past conversation session for previous interaction history.

Referring to FIG. 4, information for the conversation session may, for example, include a session identification (sID), interactants (Interactants) participating in a session, a starting and ending time(s) of a session (start_time, end_time, respectively), and a location of a session (place).

Referring to FIG. 5, the turn information may, for example, include a session identification (sID), a turn identification (tID), a speaker associated with a turn (speaker), a starting and ending time(s) of a turn (start_time, end_time, respectively), and a prosodic pointer (prosodic_ptr) to a prosodic features table.

FIG. 6 is a diagram showing the turn monitoring (operation) in the mobile device in FIG. 1, according to an embodiment. FIGS. 7A-7E are graphs showing distribution of feature vectors, which may be used in the turn monitoring in the mobile device in FIG. 1.

Referring to FIG. 1 through FIGS. 7A-7E, and considering a three-interactant conversation group scenario, with one interactant speaking (i.e., Interactant A or Speaker A, among Interactants A, B, and C) as in FIG. 6, a plurality of mobile devices may detect and capture, for example, through wireless receivers, sound (or voice) signals generated by the speaker (or a transmitter). Each mobile device may detect and measure strength (or volume) of sound signals generated by the speaker. A mobile device that is in close proximity to the speaker (e.g., her own phone) may detect and measure strength of the sound signals as being high (or highest), for example, relative to strength detected and measured by other mobile devices. A volume peak method may use this high strength or peak characteristic to make speaker recognition (e.g., determine who is speaking).

The volume peak method, however, has limitations. For example, location or placement of the mobile devices may not be controllable (e.g., a phone may be placed in a pocket). Some of the mobile devices may be rendered unsuitable or unusable, for example, due to a low power level or poor recording quality. And peak detection may not be accurate in an environment with background noise.

To overcome these and other limitations, a volume topography method, according to an embodiment, uses relative difference of sound signals recorded in the plurality of mobile devices.

Referring to FIG. 6, a sound signal or signals generated by the speaker (Interactant A) are recorded in different volumes (e.g., represented as a volume vector), for example, by three mobile devices (or phones). Due to relative differences in positions of the mobile devices, each interactant has unique or discriminative volume signature or volume topography (e.g., over the three mobile devices). The mobile devices collaboratively build a volume topography (database) (e.g., during the training period) and perform speaker (turn) recognition and (the) turn monitoring by analyzing and matching a newly measured volume vector or vectors with the volume topography (database) (e.g., after the training period).

The volume topography method, according to the embodiment, is much lighter than conventional speaker recognition methods, as relatively complex signal processing may be substantially limited to the training period. The volume topography method (and the mobile device and system using the method) are resource- and energy-efficient as the method uses much simplified computation. The volume topography method provides agile turn monitoring (e.g., with speed and reliability), as a very short sensing window (e.g., 0.3 seconds) may be used. Also, the volume topography method provides accurate speaker recognition (even) in an environment with background noise, as a sound signal (despite) containing background noise may be consistently matched with volume topography (also containing the background noise).

Each of the mobile devices may sample the sound signals, for example, during the training period. The sound signals may be sampled, for example, a rate of 8 kHz. An audio stream (of the sound signals sampled) may be segmented, for example, into 300 ms-frames (2400 samples). At or for a given time "t" and each mobile device "i" (of the mobile devices), a power (of the frame) of the mobile device "i," at time "t," may be calculated as $p(t,i)$, which may be an average of a square of the sound signals. A feature vector $P(t)$ may be defined as $\{p(t,1), p(t,2), \ldots, p(t,np)\}$, where "np" is a quantity of the mobile devices. The quantity "np" may be equal to or less than a number of the interactants in the conversation group. For example, the quantity "np" may be a quantity of the mobile devices participating in the (collaborative) turn monitoring in the conversation group. The mobile devices may collect the feature vector $P(t)$ for L seconds, where L is a parameter for the training period. The parameter L may, for example, be 60 (seconds). For the 300 ms-frames, for example, 200 of the feature vector $P(t)$ may be collected in L=60 (seconds).

For accuracy of the turn monitoring, for example, the volume topography may be created based on the feature vector $P(t)$.

Figure 7A:
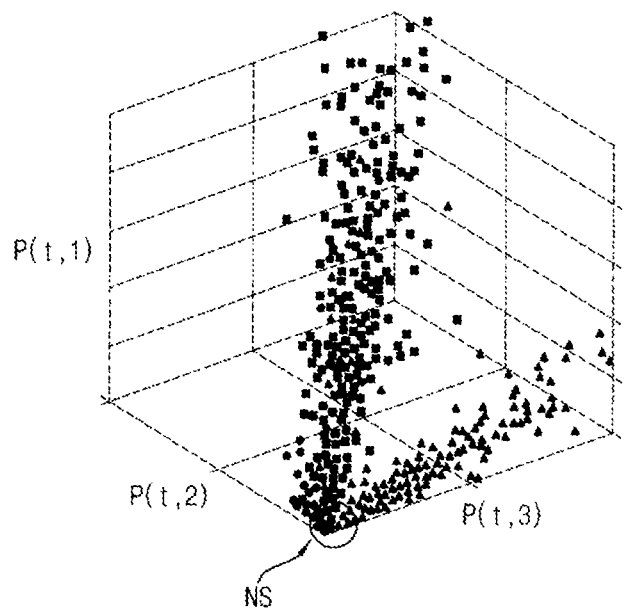
FIGS. 7A-7E are graphs showing distribution(s) of feature vectors which may be used in turn monitoring (operation) in the mobile device according to an embodiment.

FIG. 7A is a graph showing a distribution of the feature vector $P(t)$ for a conversation group with three interactants with three mobile devices.

For increasing the accuracy of the turn monitoring, the feature vector $P(t)$ may be defined or transformed for discriminative power.

For example, the volume topography may be created based on a normalized feature vector $P'(t)$, which may be a quotient of the feature vector $P(t)$ and $E(t)$, where $E(t)$ is an average of the feature vector $P(t)$: $P'(t)=P(t)/E(t)=\{p(t,1)/E(t), p(t,2)/E(t), \ldots, p(t,np)/E(t)\}$.

Figure 7B:
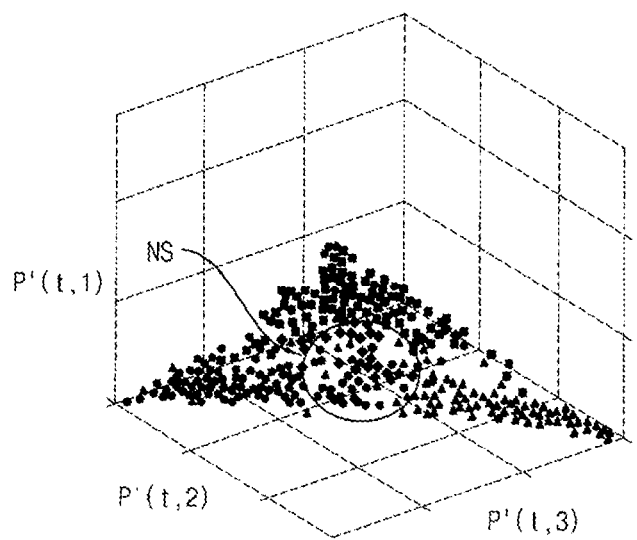
Figure 7C:
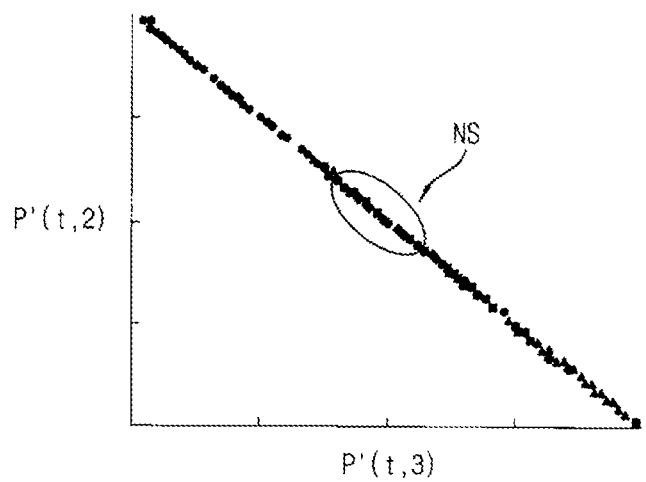

FIG. 7B is a graph showing a distribution of the normalized feature vector $P'(t)$ for the conversation group with three interactants with three mobile devices. In FIGS. 7A-7E, "NS" indicates a cluster of (the) non-speech or silent turn(s). The volume topography based on the normalized feature vector $P'(t)$ may be used to (relatively more) accurately determine and distinguish the speech and non-speech turn (for each) of the interactants. FIG. 7C is a graph showing a distribution of the normalized feature vector $P'(t)$ for a conversation group with three interactants (but) with two mobile devices.

For example, the volume topography may also be created based on a transformed vector $P''(t)$, which may be a product of the normalized feature vector $P'(t)$ and a decibel measured on the mobile device "i": $P''(t)=D(t)*P'(t)=\{D(t,1)*p(t,1)/E(t), D(t,2)*p(t,2)/E(t), \ldots, D(t,np)*p(t,np)/E(t)\}$, where the decibel is defined as $D(t,i)=20*\log 10(p(t,i)/p.ref)$, and where p.ref is a standard reference sound pressure level. For example, the standard reference "p.ref" may be 20 µPa.

Figure 7D:
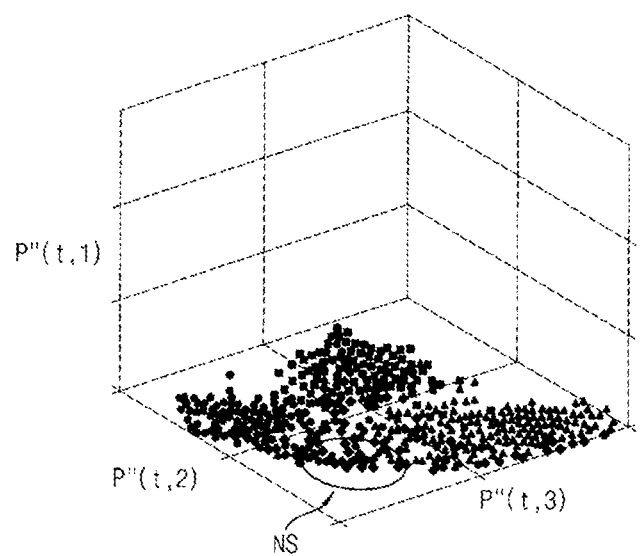
Figure 7E:
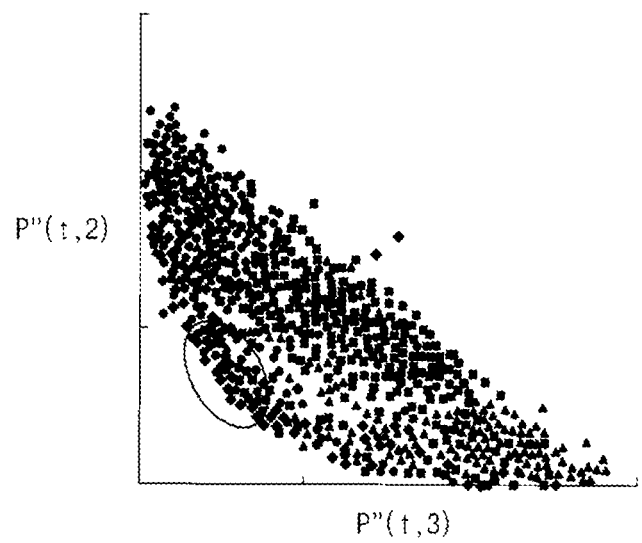

FIG. 7D is a graph showing a distribution of the transformed vector $P''(t)$ for the conversation group with three interactants with three mobile devices. FIG. 7E is a graph showing a distribution of the transformed feature vector $P''(t)$ for the conversation group with three interactants (but) with two mobile devices. The volume topography based on the transformed feature vector $P''(t)$ may be used to (relatively more) accurately determine and distinguish the speech and non-speech turn (for each) of the interactants, where the quantity "np" or the quantity of the mobile devices participating in the (collaborative) turn monitoring in the conversation group may be less than the number of the interactants in the conversation group.

Based on a dataset collected, for example, during the training period, the volume topography (e.g., represented as a set of audio (signal) signatures) may be created (for a speech case) for each of the interactants in the conversation group. The volume topography may be created for a silent or non-speech case in the conversation group, for example, when none of the interactants speaks. The volume topography may also be created for the silent or non-speech case for all of the interactants in the conversation group.

For example, for "n" number of the interactants in the conversation group, a total "n+1" quantity of the volume topography may be created. Each volume topography in the "n" quantity of the volume topography(s) may correspond to or be associated with each interactant of the "n" interactants in the conversation group; the "1" volume topography may be associated with or characterized by the non-speech case in the conversation group.

According to one embodiment, the volume topography may be created before the training period, for example, by applying conventional method (e.g., the volume peak method) in parallel.

According to another embodiment, the volume topography may be re-trained or recreated to instantaneously incorporate or reflect any change in the conversation group and other dynamic events in the surrounding area, for example, during the learning period. The change may be based on various sources: e.g., addition (joining) or deletion (leaving) of new or existing interactants and erratic turn (taking) patterns by the interactants. The volume topography may be re-trained while a prior version of the volume topography is being used.

In the dataset collected, for example, during training period, the feature vectors are labeled with cluster-ID's. The turn may be determined simply by mapping incoming frames (of the audio stream of the sound signals sampled) into the cluster-ID's, for example, after the training period. The mapping may be performed, for example, by an SVM classifier.

The turn may be detected and determined, for example, when two consecutive frames (in the audio stream) belong to different clusters. According to one embodiment, the non-speech turn, which may be less than 300 ms, may not be considered as the non-speech turn may, for example, be a small pause.

A mapping table may be created to convert the audio signatures or cluster-ID's to member-ID's for each of the interactants (or member) in the conversation group, for example, during the training period. Each mobile device may train speaker or voice recognition algorithm for the interactant (e.g., to whom each mobile device belongs). the mobile device may use all of the frames in each of the audio signatures to generate MFCC's and compute GMM's, for example, after the training period. A head cluster among the clusters may collect GMM's from each of the interactants and perform mapping of the cluster-ID's to the member-ID's.

According to one or more embodiments, the training period may be relatively very short (e.g., 30-60 seconds) in duration, and thus, the turn monitoring (operation) may commence immediately with a beginning of a conversation (session).

As a rate of sound signal sampling in the turn detector 300 increases, accuracy of the turn monitoring may increase; and as the rate of sampling decreases, the accuracy of the turn monitoring may decrease. According to one embodiment, the turn detector 300 may perform the turn monitoring with sufficiently high accuracy at a low rate of sampling of 500 Hz. Thus, the rate of sampling rate in the turn detector 300 may, for example, be 500 Hz. According to another embodiment, a user's (e.g., the interactant's) privacy may be protected as the sound signals may, for example, be sampled at a very low rate (e.g., 500 Hz).

An interaction monitoring system, according to an embodiment, may include a plurality of mobile devices. For example, the interaction monitoring system may include a first mobile device, which primarily determines the turn, and a second mobile device, which receives the turn from the first mobile device. The first mobile device may be a head mobile device; the second mobile device may be a guest mobile device. For example, the interaction monitoring system may include a plurality of guest mobile devices.

During the conversation session, the head mobile device may be changed from the first mobile device to the second mobile device. The second mobile device may then operate as the head mobile device, and the first mobile device may then operate as the guest mobile device.

The head mobile device may perform (each respective) operations of the conversation group detector 100, the monitoring planner 200, the turn detector 300, the meta-linguistic information processor 400, and the interaction history manager 500, in FIG. 1.

The guest mobile device may perform (each respective) operations of the conversation group detector 100, the meta-linguistic information processor 400, and the interaction history manager 500, in FIG. 1.

The head mobile device may be selected by the head selector 140 of the conversation group detector 100. The head mobile device may coordinate collaborative turn monitoring by the plurality of mobile devices in the conversation group. The head mobile device may create volume topography of its own and collect volume features (e.g., different sound signal strength, unique volume-signatures information) and volume topography from (each of) the guest mobile devices. The head mobile device may sample sound signals and monitor and determine the turn by matching the sound signals with the volume topographies. The head mobile device may output or transmit the turn (e.g., the turn information in FIG. 5) to the guest mobile devices in the conversation group.

The meta-linguistic information processor 400 in the head mobile device extracts or determines meta-linguistic context of the interactants in the conversation group based on the turn determined by the turn detector 300.

The meta-linguistic information processor 400 in the guest mobile device extracts or determines the meta-linguistic context of the interactants in the conversation group based on the turn determined by the head mobile device.

According to one or more embodiment(s), the volume topography may be instantly and reliably created and thus, a highly agile turn monitoring may be performed. For example, the turn monitoring may be performed in much shorter time. According to one or more embodiment(s), the volume topography may be quickly retrained and/or recreated in-situ to instantaneously to incorporate or reflect any change in the conversation group and other dynamic events in the surrounding area: e.g., positions of the mobile devices, addition (joining) or deletion (leaving) of new or existing interactants, and background noise or other sound characteristics. Thus, accurate turn monitoring may be performed in various environments.

FIGS. 8A-8C are diagrams showing examples of mobile interaction monitoring application in the mobile device in FIG. 1.

Referring to FIG. 1 through FIGS. 8A-8C, a plurality of mobile interaction monitoring applications may be executed in the mobile device in FIG. 1. The mobile applications may generate a detailed report of a face-to-face interaction.

The mobile application may scan one or more mobile devices, for example, belonging to the interactants in the given perimeter or the general surrounding area and set the conversation group. The mobile application may (then) create the volume topography based on the sound signals detected in the mobile devices in the conversation group and determine the turn based on the volume topography. Based on the turn, the mobile application may determine and generate a detailed report of the conversation group, the interactants in the conversation group, and the conversation sessions.

The mobile application may determine the features of the turn, for example, categorized as: (i) individual for each of the interactants (e.g., the speaking time, the quantity and duration of the speech and non-speech turns, and the associated statistics); (ii) relational or relative among the interactants (e.g., the turn-taking orders, pair-wise turn-taking frequencies, the ratio of the turns among the interactants); and (iii) sessional or cumulative for the conversation session and for the conversation group (e.g., the number of the interactants in the conversation session, the duration of the conversation session, the duration of the speech and non-speech turns for the conversation session and for the conversation group).

Referring to FIG. 8A, the mobile application may, for example, determine a (total) number of the interactants and cumulative conversation time for each of the interactants, with whom a user (e.g., a given interactant in the conversation group) has had a conversation session. Referring to FIGS. 8B-8C, the mobile application may, for example, determine relative conversation time (e.g., the speaking time) and a relative and cumulative quantity of the turn and turn exchanges (e.g., the turn-takings), and a ratio thereof, for each of the interactants in the conversation session. The mobile application may, for example, generate and display suggestive system remarks relating to the conversation session for the user.

Exemplary embodiments have been described in detail with references to the accompanying drawings, for illustrative purposes (and) to solve technical problems. Although the description above contains many specificities, these should not be construed as limiting the scope of the exemplary embodiments. The exemplary embodiments may be modified and implemented in various forms and should not be interpreted as thus limited.

Persons skilled in the art will understand that various modifications and alterations may be made without departing from the spirit and scope of the description and that such modifications and alterations are within the scope of the accompanying claims.

What is claimed is:

1. A mobile face-to-face interaction monitoring device, comprising:
   a conversation group detector for scanning one or more mobile devices in a surrounding area and setting a conversation group;
   a turn detector for determining turn by using volume topography created based on sound signals detected in the mobile devices in the conversation group,
   wherein the turn detector comprises:
      a volume topography builder for creating the volume topography based on the sound signals in the mobile devices in the conversation group, during a training period; and
      a volume topography matcher for determining current turn by matching current sound signals with the volume topography, after the training period; and
   a meta-linguistic information processor for extracting meta-linguistic context of interactants in the conversation group based on the turn;
   wherein the turn is a sound-signal segment where an interactant in the conversation group starts and ends the interactant's speech, and
   wherein the volume topography is created by using a signature or feature vector of volume value(s) for the sound signals detected,
   wherein the meta-linguistic context of interactants in the conversation group is extracted by extracting features of the turn and determining the features of the turn categorized as:
      individual for each of the interactants, including speaking time, a quantity and duration of speech and non-speech turns, and associated statistics, for each of the interactants;
      relational among the interactants, including orders and frequencies of exchanges of the turns and ratio thereof, among the interactants in the conversation group; and
      cumulative for one or more conversation sessions and the conversation group, including a number of the interactants in the conversation sessions, a quantity and duration of the conversation sessions, and a quantity and duration of the turns in the conversation sessions and the conversation group.

2. The mobile face-to-face interaction monitoring device according to claim 1, wherein the conversation group detector comprises:
   a voice detector for detecting sound signals, and
   an interactant manager for storing mobile device addresses and forming the conversation group when the mobile devices having the addresses are scanned.

3. The mobile face-to-face interaction monitoring device according to claim 2, wherein the conversation group detector further comprises
   a subgroup detector for determining subgroup formation by analyzing overlapping speech pattern in the sound signals.

4. The mobile face-to-face interaction monitoring device according to claim 2, wherein the conversation group detector further comprises:
   a head selector for selecting a head mobile device among a plurality of mobile devices in the conversation group, wherein
      the head mobile device collects the sound signals in the mobile devices in the conversation group, determines the turn, and transmits the turn to the mobile devices.

5. The mobile face-to-face interaction monitoring device according to claim 1, further comprising
   a monitoring planner for controlling monitoring of the turn based on information of the conversation group, wherein the monitoring planner comprises:
      a source selector for determining a quantity of the mobile devices in the conversation group and selecting one or more source mobile devices for collaborative turn monitoring among the mobile devices in the conversation group, and
      an execution planner for controlling the monitoring in the turn detector.

6. The mobile face-to-face interaction monitoring device according to claim 5, wherein the monitoring planner further comprises
   a sync manager for synchronizing the mobile devices in the conversation group.

7. The mobile face-to-face interaction monitoring device according to claim 5, wherein the monitoring planner further comprises
   a resource monitor for monitoring resources and resource utilization in the mobile devices.

8. The mobile face-to-face interaction monitoring device according to claim 1, wherein the volume topography is created by using a feature vector P(t), wherein
the feature vector P(t) is defined as P(t)=(p(t,1), p(t,2), . . . , p(t,np)),
where p(t, i) is an average of a square of the sound signals in each mobile device i of the mobile devices at a given time t, and
where np is a quantity of the mobile devices in the conversation group.

9. The mobile face-to-face interaction monitoring device according to claim 8, wherein the quantity np of the mobile devices is equal to or less than a number of the interactants in the conversation group.

10. The mobile face-to-face interaction monitoring device according to claim 8, wherein the volume topography is created by using a normalized vector P'(t), wherein
the normalized feature vector P'(t) is defined as P'(t)=P(t)/E(t),
where E(t) is an average of the feature vector P(t).

11. The mobile face-to-face interaction monitoring device according to claim 10, wherein the volume topography is created by using a transformed vector P''(t), wherein
the transformed vector P''(t) is defined as $$P''(t)=D(t)*P'(t)=\{D(t,1)*p(t,1)/E(t),D(t,2)*p(t,2)/E(t), \ldots, D(t,np)*p(t,np)/E(t)\},$$

where a decibel D(t) measured on the mobile device i, at the given time t, is defined as D(t,i)=20*log 10 (p(t,i)/p.ref),
where p.ref is a standard reference sound pressure level.

12. The mobile face-to-face interaction monitoring device according to claim 1, wherein the volume topography builder creates a quantity of n+1 of the volume topography, where
n is a number of the interactants in the conversation group, and wherein:
each of the n-quantity of the volume topography created respectively corresponds to each of the n-number of the interactants, and
the 1-quantity of the volume topography created corresponds to non-speech in the conversation group.

13. The mobile face-to-face interaction monitoring device according to claim 1, wherein the volume topography builder recreates the volume topography when there is a change in the conversation group and the surrounding area.

14. The mobile face-to-face interaction monitoring device according to claim 1, wherein the turn has factors of speaker, start time, and end time.

15. The mobile face-to-face interaction monitoring device according to claim 1, wherein the meta-linguistic information processor comprises:
a feature extractor for extracting prosodic features of the sound signals; and
a pattern analyzer for determining interaction pattern among the interactants in the conversation group, based on the turn and at least one of the prosodic features.

16. The mobile face-to-face interaction monitoring device according to claim 15, wherein the pattern analyzer determines interactivity based on a quantity of the turn in a given time.

17. The mobile face-to-face interaction monitoring device according to claim 15, wherein the pattern analyzer determines sparseness based on a quantity of non-speech turn in a given time.

18. The mobile face-to-face interaction monitoring device according to claim 15, wherein the pattern analyzer determines skewness based on a standard deviation of a quantity of the turn for all of the interactants.

19. The mobile face-to-face interaction monitoring device according to claim 1, further comprising
an interaction history manager for storing information of the turn and a conversation session and supporting user query and generating an interaction history based on the information.

20. A mobile face-to-face interaction monitoring method, comprising:
scanning one or more mobile devices in a surrounding area and setting a conversation group;
detecting sound signals in the mobile devices in the conversation group, relative to differences in positions of the mobile devices;
creating volume topography based on the sound signals for each interactant in the conversation group;
determining turn by using the volume topography; and
extracting meta-linguistic context of interactants in the conversation group based on the turn,
wherein the turn is a sound-signal segment where each interactant in the conversation group starts and ends the interactant's speech,
wherein the volume topography is created by using a signature or feature vector of volume value(s) for the sound signals detected, and
wherein the creating the volume topography based on the sound signals is performed by creating a quantity of n+1 of the volume topography, where
n is a number of the interactants in the conversation group, and wherein:
each of the n-quantity of the volume topography created respectively corresponds to each of the n-number of the interactants, and
the 1-quantity of the volume topography created corresponds to non-speech or silent turns in the conversation group.

21. The mobile face-to-face interaction monitoring method according to claim 20, further comprising:
determining a quantity of the mobile devices in the conversation group; and
selecting one or more source devices among the mobile devices in the conversation group, for collaborative turn monitoring among the mobile devices in the conversation group.

22. The mobile face-to-face interaction monitoring method according to claim 21, further comprising
synchronizing the mobile devices in the conversation group.

23. The mobile face-to-face interaction monitoring method according to claim 20, wherein:
the creating the volume topography based on the sound signals is performed during a training period; and
the determining the turn by using the volume topography comprises
determining current turn by matching current sound signals with the volume topography, after the training period.

24. The mobile face-to-face interaction monitoring method according to claim 23, wherein the creating the volume topography based on the sound signals is performed by using a feature vector P(t), wherein
the feature vector P(t) is defined as P(t)=(p(t,1), p(t,2), . . . , p(t,np)), where p(t, i) is an average of a square of the sound signals in each mobile device i of the mobile devices at a given time t, and where np is a quantity of the mobile devices in the conversation group.

25. The mobile face-to-face interaction monitoring method according to claim 24, wherein the quantity np of the mobile devices is equal to or less than a number of the interactants in the conversation group.

26. The mobile face-to-face interaction monitoring method according to claim 24, wherein the creating the volume topography based on the sound signals is performed by using a normalized vector P'(t), wherein the normalized feature vector P'(t) is defined as P'(t)=P(t)/E(t), where E(t) is an average of the feature vector P(t).

27. The mobile face-to-face interaction monitoring method according to claim 26, wherein the creating the volume topography based on the sound signals is performed by using a transformed vector P"(t), wherein the transformed vector P"(t) is defined as $$P''(t)=D(t)*P'(t)=\{D(t,1)*p(t,1)/E(t),D(t,2)*p(t,2)/E(t),\ldots,D(t,np)*p(t,np)/E(t)\},$$

where a decibel D(t) measured on the mobile device i, at the given time t, is defined as $D(t,i)=20*\log 10\,(p(t,i)/p.ref)$, where p.ref is a standard reference sound pressure level.

28. The mobile face-to-face interaction monitoring method according to claim 23, further comprising:

recreating the volume topography when there is a change in the conversation group and the surrounding area.

29. The mobile face-to-face interaction monitoring method according to claim 23, wherein the turn has factors of speaker, start time, and end time.

30. The mobile face-to-face interaction monitoring method according to claim 20, wherein the extracting the meta-linguistic context of interactants in the conversation group based on the turn comprises:

extracting features of the turn;
extracting prosodic features of the sound signals; and
determining interaction pattern among the interactants in the conversation group, based on the features of the turn and at least one of the prosodic features.

31. The mobile face-to-face interaction monitoring method according to claim 30, wherein the extracting features of the turn is performed by determining the features of the turn categorized as:

individual for each of the interactants, including speaking time, a quantity and duration of speech and non-speech turns, and associated statistics, for each of the interactants;

relational among the interactants, including orders and frequencies of exchanges of the turns and ratio thereof, among the interactants in the conversation group; and cumulative for one or more conversation sessions and the conversation group, including a number of the interactants in the conversation sessions, a quantity and duration of the conversation sessions, and a quantity and duration of the turns in the conversation sessions and the conversation group.

32. An interaction monitoring system, comprising:

a first mobile device, which determines turn, and at least one second mobile device, which receives the turn determined from the first mobile device;

wherein the first mobile device comprises:

a first conversation group detector for scanning one or more mobile devices in a surrounding area and setting a conversation group, a turn detector for determining turn for interactants in the conversation group by using volume topography created by using a signature or feature vector of volume value(s) based on sound signals detected in the mobile devices, relative to different positions of the first and second mobile devices, and represented as a set of sound-signal signatures for each of the interactants, and a first meta-linguistic information processor for extracting meta-linguistic context of the interactants in the conversation group based on the turn; and wherein the second mobile device comprises:

a second conversation group detector for scanning the mobile devices in the surrounding area and setting the conversation group, and a second meta-linguistic information processor for extracting the meta-linguistic context of the interactants in the conversation group based on the turn received from the first mobile device;

wherein the volume topography is created by using a transformed vector P"(t), wherein the transformed vector P"(t) is defined as $$P''(t)=D(t)*P'(t)=\{D(t,1)*p(t,1)/E(t),D(t,2)*p(t,2)/E(t),\ldots,D(t,np)*p(t,np)/E(t)\},$$

where a decibel D(t) measured on the mobile device i, at the given time t, is defined as $D(t,i)=20*\log 10\,(p(t,i)/p.ref)$, where p.ref is a standard reference sound pressure level, and where a normalized feature vector P'(t) is defined as P'(t)=P(t)/E(t), where E(t) is an average of a feature vector P(t), where the feature vector P(t) is defined as P(t)=(p(t,1), p(t,2), ..., p(t,np)), where p(t, i) is an average of a square of the sound signals in each mobile device i of the mobile devices at a given time t, and np is a quantity of the mobile devices in the conversation group.

* * * * *